United States Patent
Nishijima

(10) Patent No.: US 9,385,615 B2
(45) Date of Patent: Jul. 5, 2016

(54) ISOLATED SWITCHING POWER SUPPLY

(71) Applicant: FUJI ELECTRIC CO., LTD., Kawasaki-shi (JP)

(72) Inventor: Kenichi Nishijima, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 13 days.

(21) Appl. No.: 14/471,837

(22) Filed: Aug. 28, 2014

(65) Prior Publication Data

US 2015/0078040 A1    Mar. 19, 2015

(30) Foreign Application Priority Data

Sep. 18, 2013    (JP) ................................. 2013-193049

(51) Int. Cl.
*H02M 3/335* (2006.01)
*H02M 1/00* (2006.01)

(52) U.S. Cl.
CPC .. *H02M 3/33523* (2013.01); *H02M 2001/0025* (2013.01); *H02M 2001/0032* (2013.01); *H02M 2001/0035* (2013.01); *Y02B 70/16* (2013.01)

(58) Field of Classification Search
CPC ................. H02M 2001/0032; H02M 3/33523; H02M 3/28; Y02B 3/33523
USPC ......... 363/16–20, 21.01, 21.04, 21.08, 21.12, 363/21.15, 95.98
See application file for complete search history.

(56) References Cited

U.S. PATENT DOCUMENTS

| | | | | |
|---|---|---|---|---|
| 6,252,783 B1 * | 6/2001 | Huh | ................... | H02M 3/33523 363/21.01 |
| 7,692,417 B2 * | 4/2010 | Dagher | ................. | H02M 3/157 323/285 |
| 8,514,493 B2 * | 8/2013 | Endle | ........................ | B44F 1/10 359/619 |
| 8,687,384 B2 * | 4/2014 | Chen | ................. | H02M 3/33523 363/19 |
| 8,971,060 B2 * | 3/2015 | Wu | ................... | H02M 3/33523 363/21.12 |
| 2012/0170326 A1 | 7/2012 | Yang | | |

\* cited by examiner

*Primary Examiner* — Rajnikant Patel
(74) *Attorney, Agent, or Firm* — Rossi, Kimms & McDowell LLP

(57) ABSTRACT

An isolated switching power supply can include a switching element connected to an input power supply, a control circuit that ON/OFF-drives the switching element and generates an AC power in a secondary winding and in an auxiliary winding of the isolation transformer, an output circuit that rectifies the AC power generated in the on a secondary winding of the isolation transformer and outputs the rectified power, an internal power supply circuit that generates a driving power supply voltage for the control circuit from the AC power generated in the auxiliary winding, an output voltage detecting circuit that feeds back an output monitoring voltage obtained from the driving power supply voltage to the control circuit to control the ON/OFF driving of the switching element by the control circuit and an output voltage controller that changes a level of the output monitoring voltage obtained from the driving power supply voltage.

5 Claims, 3 Drawing Sheets

ISOLATED SWITCHING POWER SUPPLY

CROSS-REFERENCE TO RELATED APPLICATION

This application is based on, and claims priority to, Japanese Patent Application No. 2013-193049, filed on Sep. 18, 2013, the contents of which are incorporated herein by reference.

BACKGROUND OF THE INVENTION

1. Field of the Invention

Embodiments of the invention relate to isolated switching power supplies.

2. Description of the Related Art

FIG. 5 shows an example of isolated switching power supply having a main circuit 2 including a primary winding P1 of an isolation transformer T connected to an input power supply Vin and a switching element SW connected to the primary winding P1. The switching element SW is composed of an IGBT or a power MOSFET, for example. The switching element SW is ON/OFF driven by a control circuit 3 constructed as a power supply IC, for example, to generate an AC power in a secondary winding S and an auxiliary winding P2 of the isolation transformer T.

The AC power generated in the secondary winding S of the isolation transformer T is rectified through a diode D1 and smoothed through a capacitor C1, and then delivered to a load (not illustrated in the figure) as a specified DC output voltage Vout. The diode D1 and the capacitor C1 connected to the secondary winding S of the isolation transformer T compose an output circuit 4 of the isolated switching power supply 1. The AC power generated in the auxiliary winding P2 of the isolation transformer T is rectified through a diode D2 and smoothed through a capacitor C2, and then delivered to the control circuit 3. The diode D2 and the capacitor C2 connected to the auxiliary winding P2 of the isolation transformer T compose an internal power supply circuit 5 for generating a driving power supply voltage Vcc of the control circuit 3.

The output circuit 4 is provided with an output voltage detecting circuit 6 that detects the output voltage Vout dividing the output voltage. The output voltage detecting circuit 6 comprises for example, resistors R1 and R2 connected in series that divide the output voltage Vout and obtain an output monitoring voltage. The output monitoring voltage detected by the output voltage detecting circuit 6 is fed back to an FB terminal of the control circuit 3 through a photo-coupler PC.

The control circuit 3 controls the ON/OFF driving of the switching element SW as described previously corresponding to the fed back output monitoring voltage to stabilize the output voltage Vout at a constant value. The feedback control of the switching element SW can be carried out, for example, by changing the ON/OFF widths of the switching element SW or by changing the switching frequency of the switching element SW. The isolated switching power supply constructed as described above is called a power supply of a secondary side feedback type The isolated switching power supply shown in FIG. 6, in contrast, obtains the output monitoring voltage from the driving power supply voltage Vcc generated by the internal power supply circuit 5 that is provided with an output voltage detecting circuit 6, in place of obtaining the output monitoring voltage in the output circuit 4 as in the isolated switching power supply of FIG. 5. The output monitoring voltage detected by the output voltage detecting circuit 6 in the isolated switching power supply of FIG. 6 varies corresponding to the ratio of winding numbers Ns:Naux, where Ns is the winding number of the secondary winding S and Naux is the winding number of the auxiliary winding P2. The isolated switching power supply constructed as described above is called a power supply of a primary side feedback type, and described in detail in U.S. Patent Application Publication No. 2012/0170326, for example. The isolated switching power supply of a primary side feedback type can feedback the output monitoring voltage to the control circuit 3 without using a photo-coupler PC, which reduces the number of components and is an advantage of that type of isolated switching power supply.

These types of isolated switching power supplies shown in FIGS. 5 and 6 set a low power standby mode in a light load period with a low output current in order to save power. The low power standby mode decreases the output voltage Vout when the output current from the output circuit 4 is small and the load (not shown in the figure) needs very little power, and reduces the power consumption in the isolated switching power supply.

The low power standby mode is generally set by giving an external control signal to change a voltage dividing ratio of the output power supply voltage Vout in the output voltage detecting circuit 6 in FIG. 5 or a voltage dividing ratio of the driving power supply voltage Vcc in FIG. 6. More specifically as shown in FIG. 5 and FIG. 6, an auxiliary resistor R3 is provided through a switch Sa in parallel to the resistor R1. The switch Sa is turned ON by the control signal to connect the auxiliary resistor R3 in parallel to the resistor R1 thereby changing the voltage dividing ratio of the output voltage detecting circuit 6. This change of the voltage dividing ratio changes the level of the output monitoring voltage fed back to the control circuit 3 to decrease the output voltage Vout. The switch Sa and the auxiliary resistor R3 compose an output voltage controlling means 7.

When the low power standby mode is set, the control circuit 3 generates an idle period, for example, in the ON/OFF driving of the switching element SW to restrict an average output power through the isolation transformer T, which is an effective output power. The intermittent operation control of the switching element SW as mentioned above by the control circuit 3 is generally called a burst operation mode.

When the low power standby mode is set in an isolated switching power supply of the primary side feedback type, a control signal has to be given to the isolated switching power supply from an external device in the load side. This process needs isolation of the control signal between the external device and the control circuit 3. The control signal isolation can be readily implemented by using a photo-coupler, for example. However, the newly required photo-coupler cancels the advantage of the isolated switching power supply of a primary side feedback type, which can reduce the number of components.

SUMMARY OF THE INVENTION

Some embodiments of the invention have been made in view of the situation described above, and in view of other shortcomings in the related art. Some embodiments provide an isolated switching power supply having a simple construction containing a small number of components and being able to set a low power standby mode without using a photo-coupler.

In some embodiments, an isolated switching power supply comprises: a switching element that is connected to an input power supply through a primary winding of an isolation transformer; a control circuit that ON/OFF-drives the switching element and generates an AC power in a secondary winding and in an auxiliary winding of the transformer, and can be implemented as a power supply IC capable of setting a low power standby mode; an output circuit that rectifies the AC power generated in the secondary winding of the isolation transformer and outputs the rectified power; an internal power supply circuit that generates a driving power supply voltage for the control circuit from the AC power generated in the auxiliary winding of the transformer; an output voltage detecting circuit that feeds back an output monitoring voltage obtained from the driving power supply voltage generated by the internal power supply circuit to the control circuit to control the ON/OFF driving of the switching element by the control circuit; an output voltage controller that changes a level of the output monitoring voltage obtained from the driving power supply voltage corresponding to a change of a condition for the ON/OFF driving of the switching element in the control circuit to change-over between a normal operation mode and the low power standby mode.

In an isolated switching power supply of a primary side feedback type of some embodiments of the invention, the output voltage controller changes the output monitoring voltage level automatically corresponding to change of the ON/OFF driving condition for the switching element in the control circuit. The change of the output monitoring voltage performs change-over between a normal operation mode and a low power standby mode.

In some embodiments, the output monitoring voltage is obtained by dividing the driving power supply voltage, and the output voltage controller changes a dividing ratio of the driving power supply voltage corresponding to the change of the condition for the ON/OFF driving of the switching element. The output monitoring voltage can alternatively be obtained by dividing an AC voltage generated across the auxiliary winding of the isolation transformer. In this case, too, the output voltage controller changes a voltage dividing ratio of the AC voltage.

In some embodiments, the output voltage controller detects decrease of an output current in the output circuit from the condition for the ON/OFF driving of the switching element in the control circuit, and sets a low power standby mode upon decrease in the output current to reduce the output voltage.

More specifically, the output voltage controller detects the change in the condition for the ON/OFF driving of the switching element in the control circuit from a change-over between a continuous operation mode and a burst operation mode of a switching operation of the switching element or from reaching a predetermined frequency value of a switching frequency of the switching element.

In an isolated switching power supply having the construction stated above, the level of the output monitoring voltage is changed-over corresponding to the operation condition of the control circuit that ON/OFF drives the switching element and is implemented as a power supply IC, for example. Thus, a change-over between a normal operation mode and a low power standby mode can be readily performed without giving an external control signal. Consequently, a photo-coupler that would be otherwise required for receiving an electrically isolated external control signal is not needed. Therefore an isolated switching power supply with a simple construction having a small number of components is achieved fully utilizing an advantage of a primary side feedback type.

The change-over between a normal operation mode and a low power standby mode can be performed readily and surely for example, by detecting a change-over point between a continuous operation mode and a burst operation mode of switching operation for the switching element, from which a light load operation can be identified. Alternatively, the change-over point can be readily and surely detected by discriminating between the switching frequency for the switching element in a heavy load period and the switching frequency in a light load period.

DETAILED DESCRIPTION OF THE INVENTION

Isolated switching power supplies according to some embodiments of the invention will be described in detail in the following with reference to the accompanying drawings.

Figure 1:
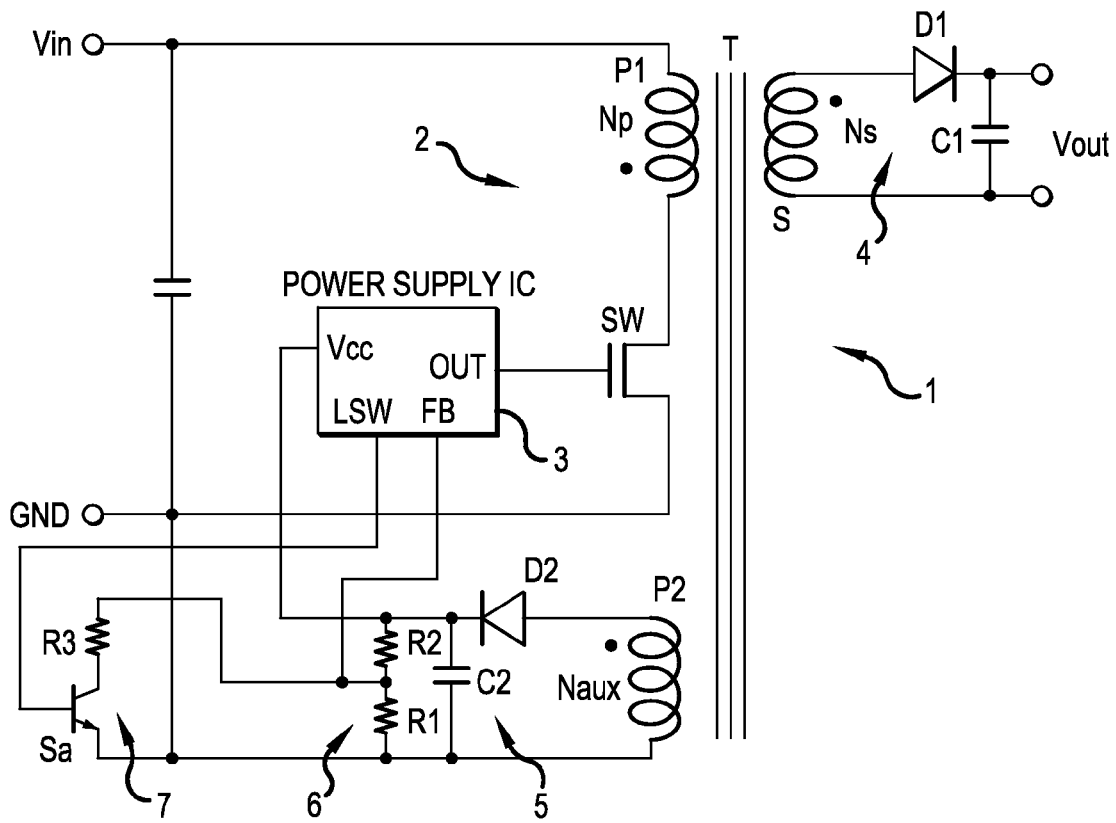
FIG. 1 is a schematic circuit diagram of a part of an isolated switching power supply according to a first embodiment of the present invention.
Figure 6:
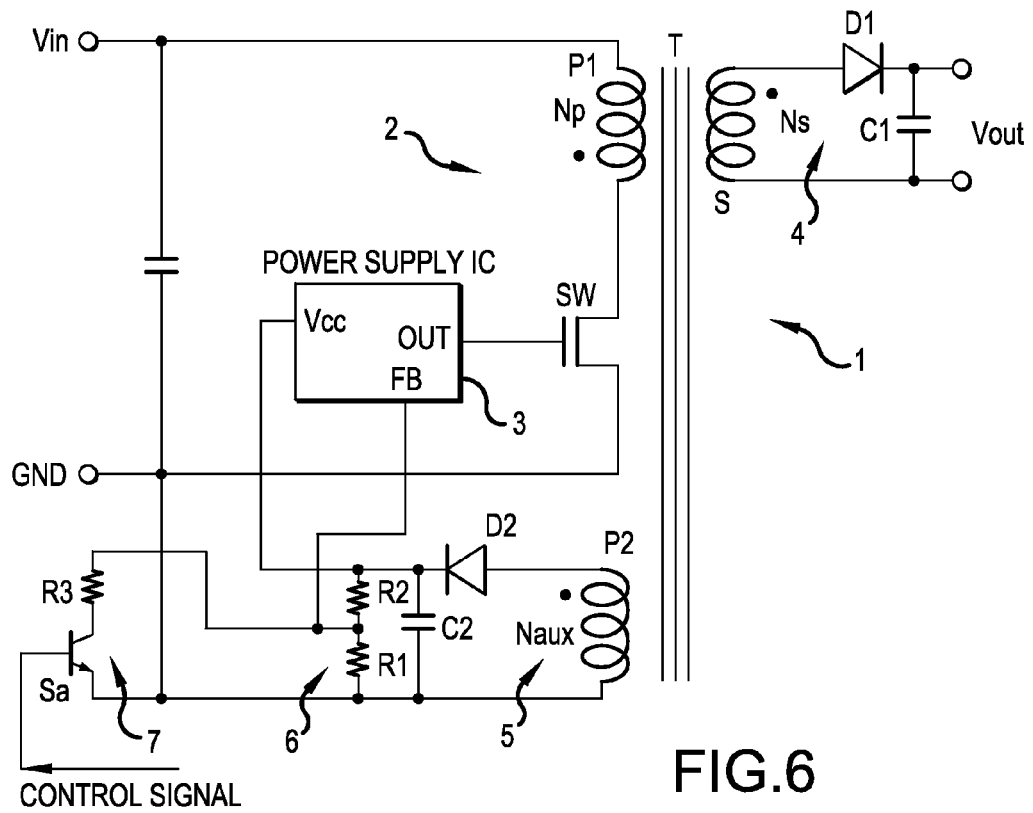
FIG. 6 is a schematic circuit diagram of a part of an isolated switching power supply of a primary side feedback type.

FIG. 1 is a schematic circuit diagram of a part of an isolated switching power supply 1 of a primary side feedback type according to a first embodiment of the present invention. This isolated switching power supply 1 has a basic construction similar to the isolated switching power supply shown in FIG. 6 and thus, is given the same symbols for the similar components and repeated description is omitted.

The isolated switching power supply according to the first embodiment features a construction in which an operation control signal is given from the control circuit 3 to the switch Sa of the output voltage controller (also referred to herein as a "controlling means") 7. Upon turning ON the switch Sa, the auxiliary resistor R3 coupled in series with the switch Sa is connected in parallel to the resistor R1 of the output voltage detecting circuit 6, thereby changing the level of the output monitoring voltage.

The operation control signal given to the switch Sa from the LSW terminal of the control circuit 3 is generated corresponding to a change of the ON/OFF driving condition for the switching element SW in the control circuit 3.

The control circuit 3 generally serves a function to regulate the output power through the isolation transformer T by changing the switching frequency of the switching element SW corresponding to a magnitude of the load. In a specific example, the control circuit 3 ON/OFF drives the switching element SW at a switching frequency of 65 kHz in a normal load operation, and at a switching frequency of 20 kHz in a light load period to regulate the output power. Consequently, the control circuit 3 in the invented power supply generates the operation control signal at the change-over point of the switching frequency of the switching element SW, thereby setting a low power standby mode.

If the control circuit 3 is able to cope with a burst operation mode in which the ON/OFF driving of the switching element SW is conducted intermittently in a light load period, the operation control signal can be generated and delivered simultaneously with the transition to the burst operation mode. In this operation scheme, the control circuit 3 ON/OFF drives the switching element SW continuously in a normal load period and changes continuously the switching frequency of the switching element SW corresponding to the magnitude of the load, thereby stabilizing the output voltage Vout at a constant value. Upon detecting a light load state from decrease in the output current Iout, the control circuit 3 transfers to a burst operation mode in which the ON/OFF driving of the switching element SW is conducted intermittently. Consequently, the control circuit 3 is constructed so as to generate the operation control signal simultaneously with the change-over between the continuous operation mode and the burst operation mode of the switching element SW.

The operation control signal is at an H level in a normal load period and at an L level in a light load period. In the normal load period, the operation control signal at the H level delivered from the control circuit 3 turns the switch Sa ON, and in the light load period, the operation control signal at the L level shuts OFF the switch Sa. Thus, the ON/OFF operation of the switch Sa changes the voltage dividing ratio of the output voltage detecting circuit 6.

Provided the number of turns of the secondary winding S of the isolation transformer T be Ns and the number of turns of the auxiliary winding P2 be Naux, and the combined resistance Rp of the resistor R1 and the auxiliary resistor R3 in parallel connection be Rp=R1 R3/(R1+R3).

In this case, the output monitoring voltage Vfb generated by the output voltage detecting circuit 6 is, in a normal load period, $$Vfb=[Rp/(Rp+R2)](Naux/Ns)Vout.$$

In a light load period, the output monitoring voltage Vfb is $$Vfb=[R1/(R1+R2)](Naux/Ns)Vout.$$

Figure 2:
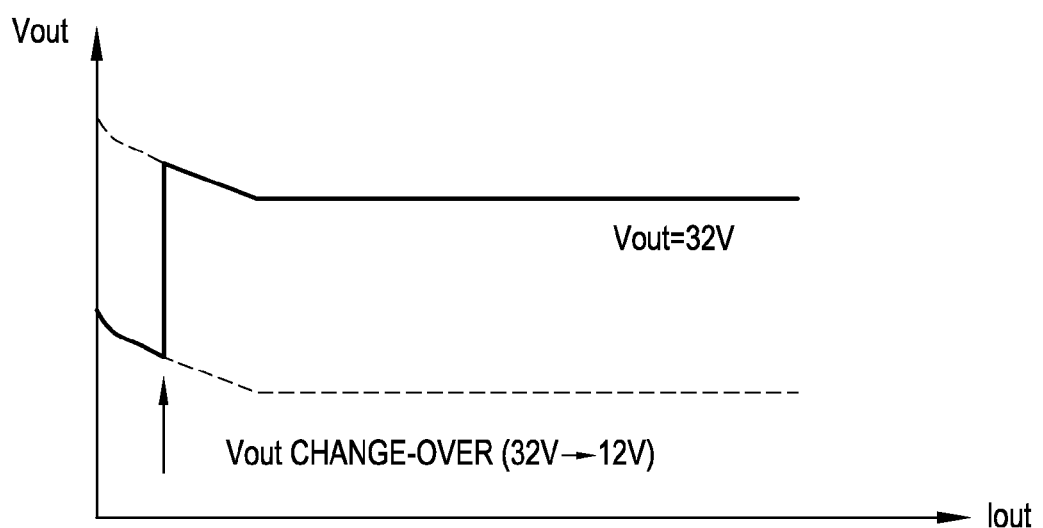
FIG. 2 shows an output characteristic of the isolated switching power supply of FIG. 1.

Thus, the switch Sa is switched ON/OFF according to the operation control signal delivered from the control circuit 3 corresponding to the change of the ON/OFF driving condition of the switching element SW by the control circuit 3. Corresponding to the ON/OFF of the switch Sa, the level of the output monitoring voltage Vfb is changed. As shown by the output characteristic of the isolated switching power supply in FIG. 2, the control circuit 3 decreases the output voltage Vout in a light load period, in which the output current Iout is small. More specifically, the control circuit 3 changes the output voltage Vout from 32 V, which is a stabilized constant value in the normal operation period, to 12 V to set a low power standby mode.

In the isolated switching power supply constructed as described above, when the control circuit 3 transforms a control scheme of switching operation of the switching element SW corresponding to the load condition, the control circuit 3 gives the operation control signal to the output voltage controlling means 7 automatically simultaneously with the transformation of the control scheme. The output detecting circuit 6 changes the level of the output monitoring voltage corresponding to the operation state of the control circuit 3, and the output monitoring voltage Vfb at a changed level is given to the control circuit 3 to change the output voltage Vout.

Thus, the control circuit 3 can set a low power standby mode automatically corresponding to the change of the operation state, without receiving an external control signal. In other words, the isolated switching power supply does not need to set a low power standby mode by receiving an external control signal through an isolating means. Consequently, a photo-coupler, which is required to receive an isolated control signal in conventional devices, is not necessary in the device of the invention. Therefore, the number of components is reduced to construct an isolated switching power supply of a primary side feedback type.

Figure 3:
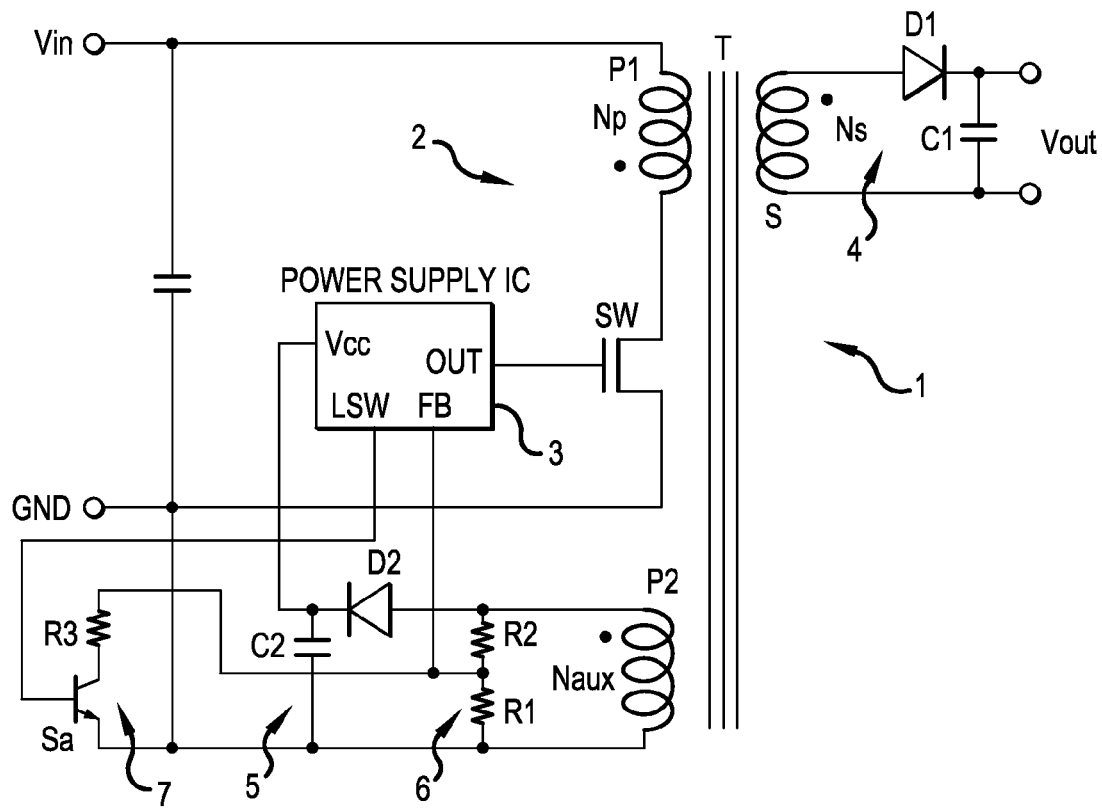
FIG. 3 is a schematic circuit diagram of a part of an isolated switching power supply according to a second embodiment of the present invention.

In the isolated switching power supply of the first embodiment described above, the output monitoring voltage is generated based on the internal power supply voltage Vcc generated by the internal power supply circuit 5 from the AC voltage developed across the auxiliary winding P2. However, as shown by the schematic construction of a part of an isolated switching power supply according to a second embodiment of the invention illustrated in FIG. 3, an output monitoring voltage in an AC form can be generated by directly dividing the AC voltage developed across the auxiliary winding P2 by the output voltage detecting circuit 6. This means that the present invention can be applied to an isolated switching power supply of an AC feedback type as well.

Figure 4:
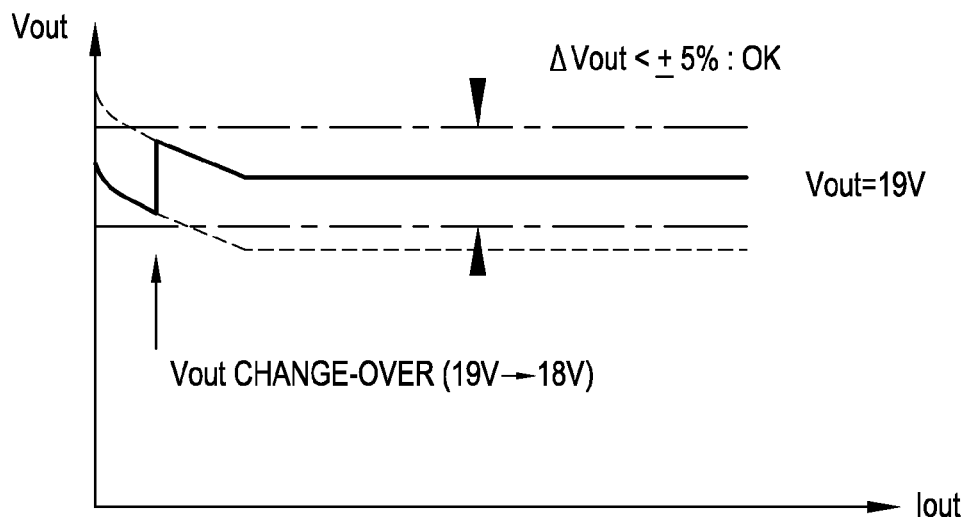
FIG. 4 shows an output characteristic of an isolated switching power supply according to a third embodiment of the invention.
Figure 5:
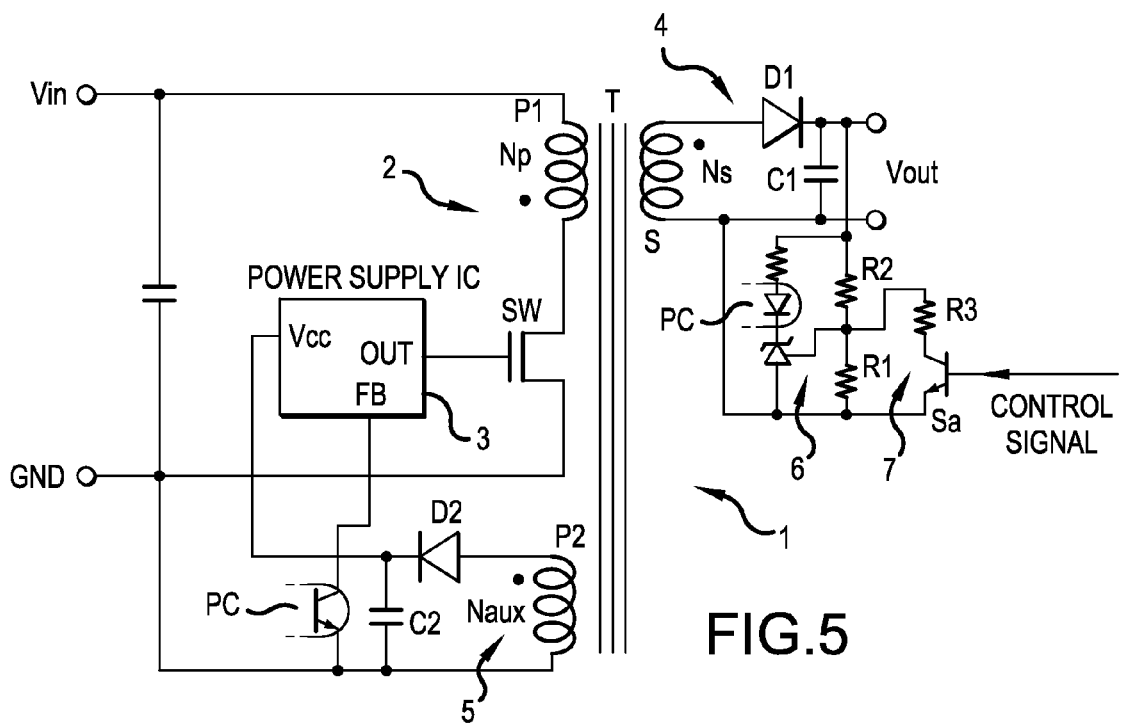
FIG. 5 is a schematic circuit diagram of a part of an isolated switching power supply of a secondary side feedback type.

FIG. 4 shows an example of an output characteristic of the isolated switching power supply according to a third embodiment of the present invention. The increase of the output voltage Vout can be controlled to be restricted in a light load period in place of setting a low power standby mode as described previously. When the switching frequency of the switching element SW is controlled corresponding to the magnitude of the load, the stabilizing control for the output voltage Vout is impaired caused by the switching characteristics of the switching element SW, gradually increasing the output voltage Vout.

When the increase of the output voltage Vout occurs, the level of the output monitoring voltage is changed using the operation control signal to decrease the control target value of the output voltage Vout. Consequently as shown in FIG. 4, the actual output voltage Vout of the isolated switching power supply can be controlled to be confined within a certain error range ΔVout irrespective of the magnitude of the load.

Embodiments of the invention are not limited to the embodiments described thus far. For example, when the output voltage Vout is preliminarily fixed for the normal operation mode and for the low power standby mode, and when the ratio of the winding number of the secondary winding S to the winding number of the auxiliary winding P2 of the isolation transformer T is preliminarily fixed, the function of the output voltage controlling means 7 can be incorporated in the control circuit 3. When the function of the output voltage controlling means 7 can be incorporated in the control circuit 3, the control circuit 3 does not need to increase the number of terminals of the power supply IC constructing the control circuit 3. The switching element SW and the switch Sa can be composed of a switching element of a silicon carbide (SiC) device. It should be understood that various changes and alternations can be made in the embodiments without departing from the spirit and scope of the invention.

What is claimed is:

1. An isolated switching power supply comprising:
   a switching element that is connected to an input power supply through a primary winding of an isolation transformer;
   a control circuit that ON/OFF-drives the switching element and generates an AC power in a secondary winding and in an auxiliary winding of the transformer;
   an output circuit that rectifies the AC power generated in the secondary winding of the isolation transformer and outputs the rectified power;
   an internal power supply circuit that generates a driving power supply voltage for the control circuit from the AC power generated in the auxiliary winding of the transformer;

an output voltage detecting circuit that feeds back an output monitoring voltage derived from the driving power supply voltage generated by the internal power supply circuit to the control circuit to control the ON/OFF driving of the switching element by the control circuit; and an output voltage controller that changes a level of the output monitoring voltage obtained from the driving power supply voltage corresponding to a change of a condition for the ON/OFF driving of the switching element in the control circuit, wherein a change of a condition signal is received at the output voltage controller directly from the control circuit.

2. The isolated switching power supply according to claim 1, wherein the output monitoring voltage is obtained by dividing the driving power supply voltage, and the output voltage controller changes a dividing ratio of the driving power supply voltage corresponding to the change of the condition for the ON/OFF driving of the switching element.

3. The isolated switching power supply according to claim 1, wherein the output voltage controller detects decrease of an output current in the output circuit from the condition for the ON/OFF driving of the switching element in the control circuit, and sets a low power standby mode upon decrease in the output current to reduce the output voltage.

4. The isolated switching power supply according to claim 1, wherein the output voltage controller detects the change in the condition for the ON/OFF driving of the switching element in the control circuit from a change-over between a continuous operation mode and a burst operation mode of a switching operation on the switching element or from reaching a predetermined frequency value of a switching frequency of the switching element.

5. The isolated switching power supply according to claim 1, wherein the control circuit is implemented as a power supply IC capable of setting a low power standby mode.

* * * * *